J. F. SHEPPARD, 2D AND W. D. FLETCHER.
WOODWORKING MACHINE.
APPLICATION FILED DEC. 21, 1918.
1,350,341. Patented Aug. 24, 1920.
5 SHEETS—SHEET 1.
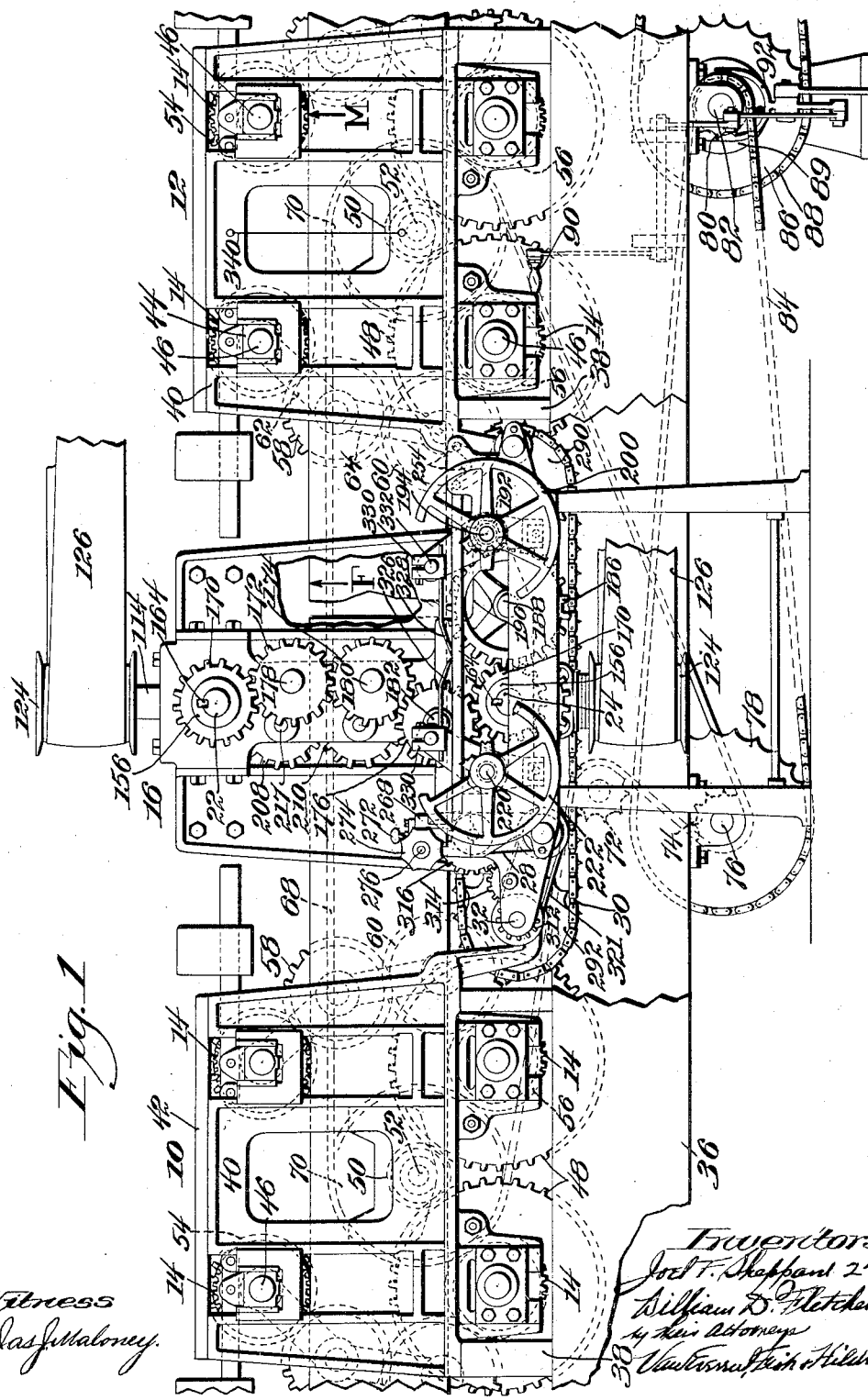
Witness
Jas J. Maloney.
Inventors
Joel F. Sheppard 2nd
William D. Fletcher
by their attorneys

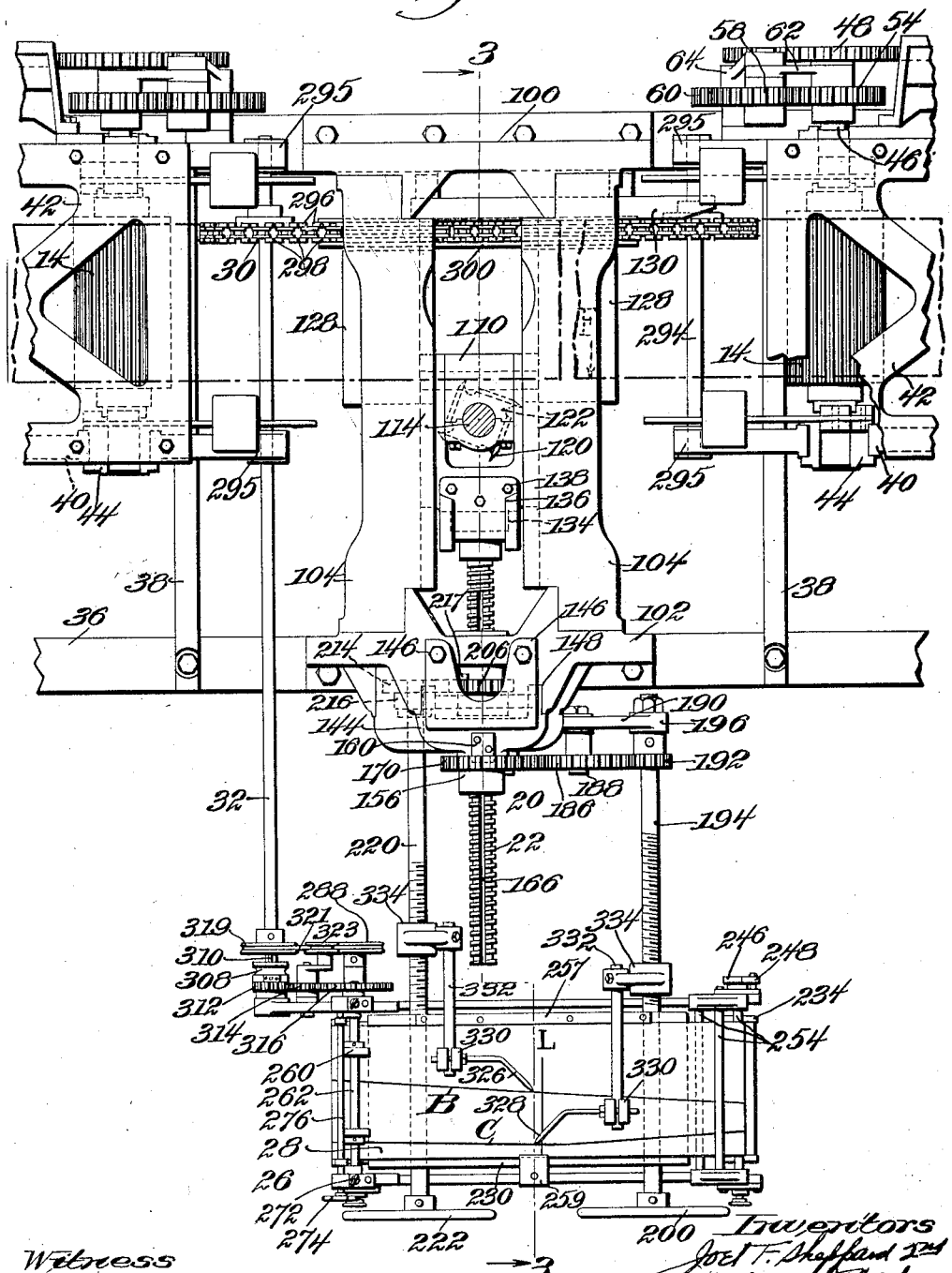

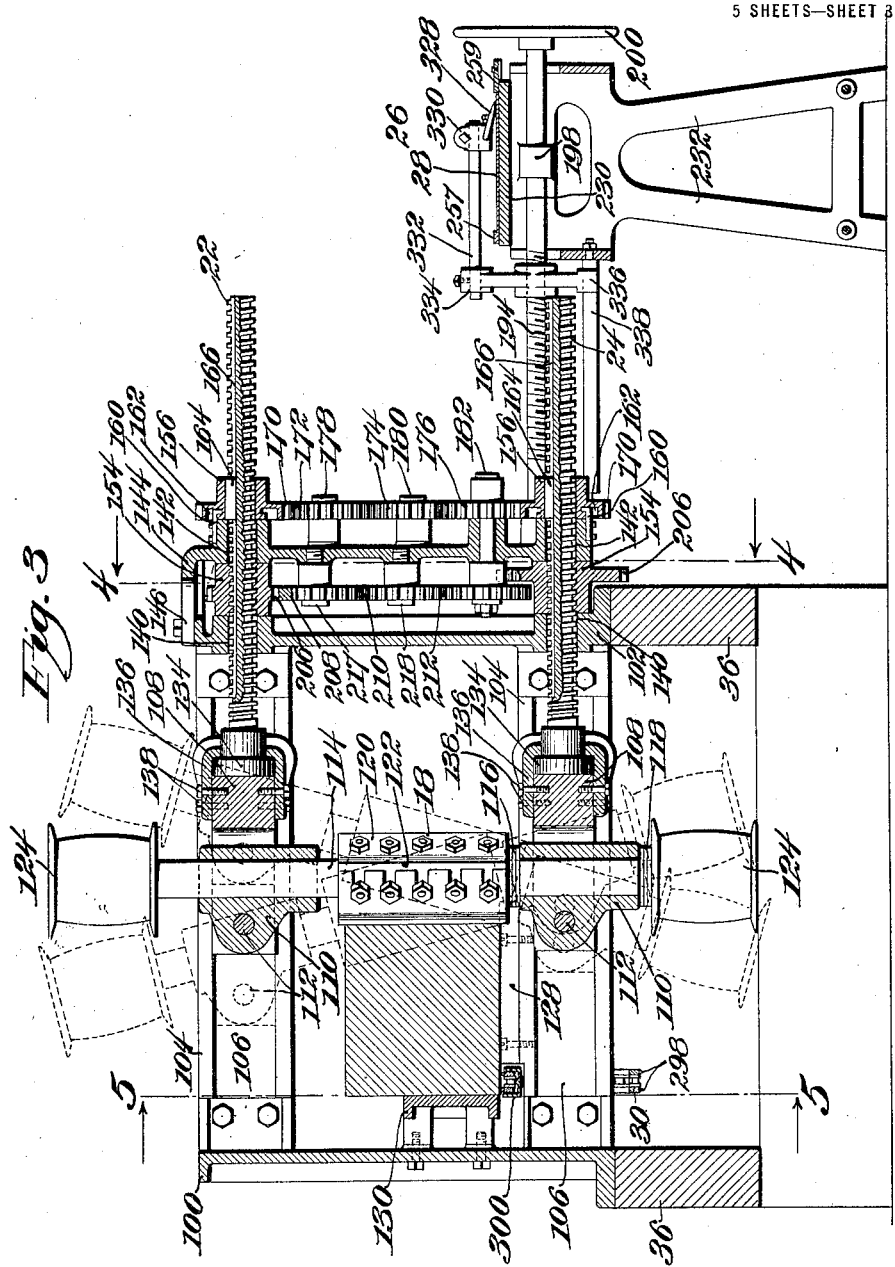

J. F. SHEPPARD, 2D AND W. D. FLETCHER.
WOODWORKING MACHINE.
APPLICATION FILED DEC. 21, 1918.
1,350,341.
Patented Aug. 24, 1920.
5 SHEETS—SHEET 4.
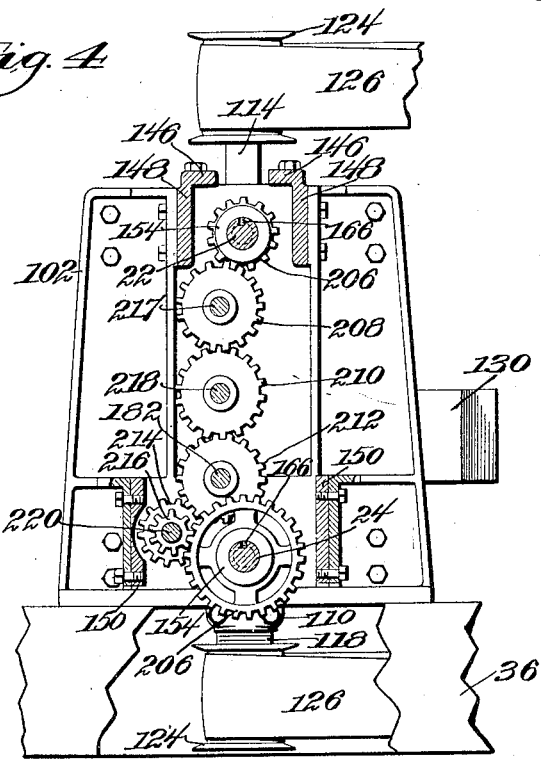
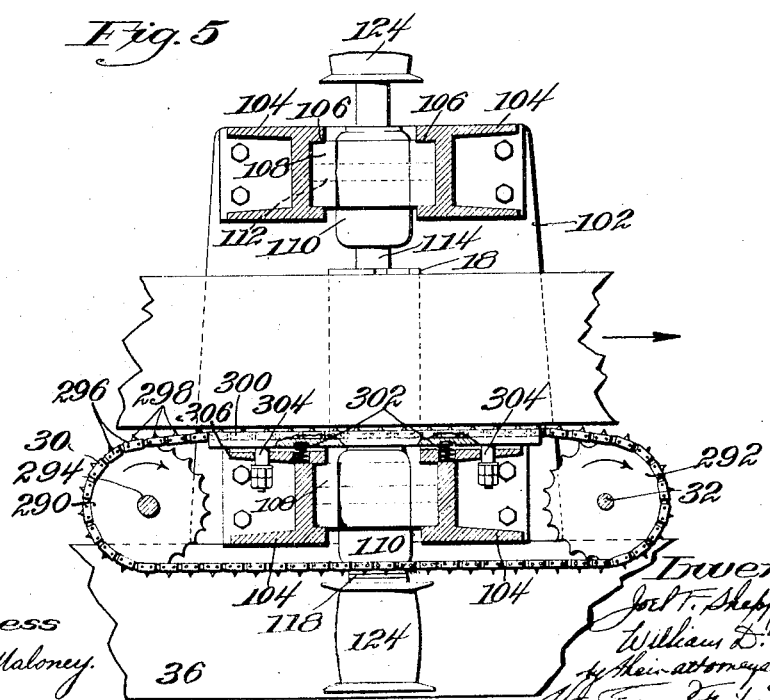

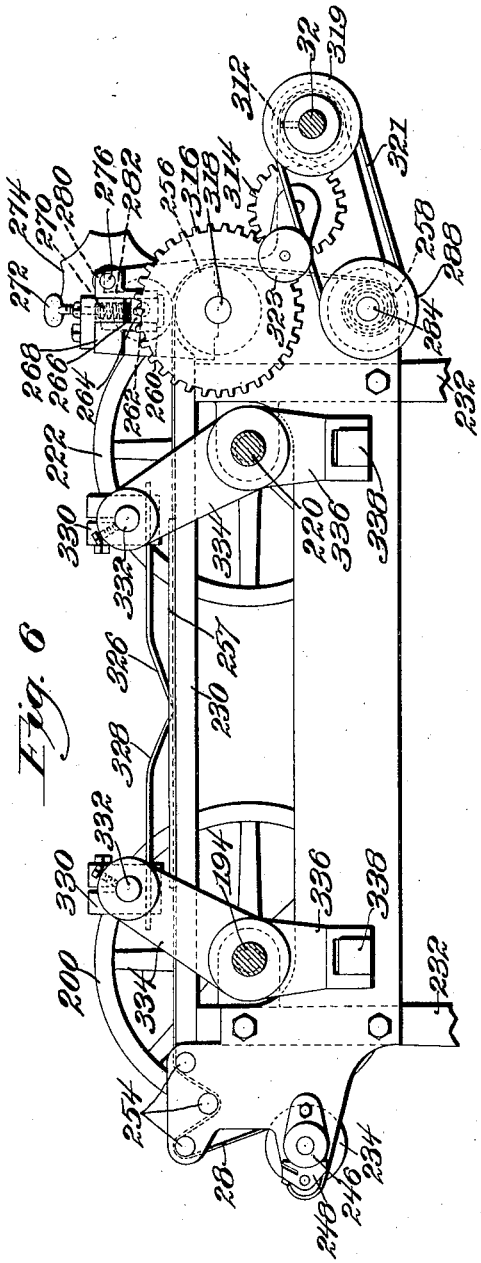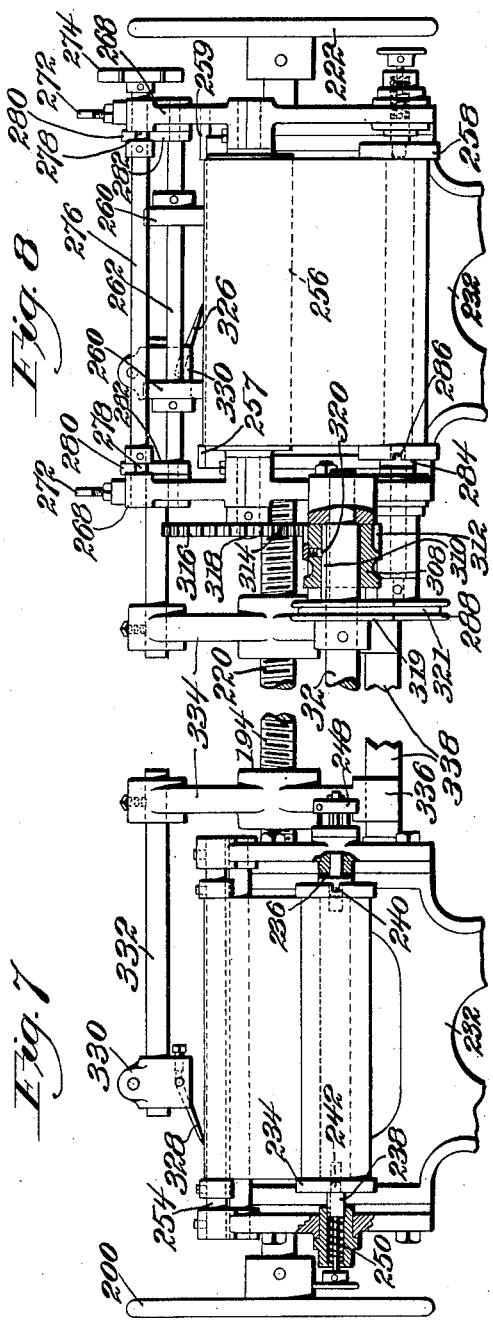

UNITED STATES PATENT OFFICE.

JOEL F. SHEPPARD, 2D, AND WILLIAM D. FLETCHER, OF DOVER, NEW HAMPSHIRE.

WOODWORKING-MACHINE.

1,350,341.  Specification of Letters Patent.  Patented Aug. 24, 1920.

Application filed December 21, 1918. Serial No. 267,815.

*To all whom it may concern:*

Be it known that we, JOEL F. SHEPPARD, 2d, and WILLIAM D. FLETCHER, citizens of the United States, residing at Dover, in the county of Strafford, State of New Hampshire, have invented certain new and useful Improvements in Woodworking-Machines; and we do hereby declare the following to be a full, clear, and exact description of the invention, such as will enable others skilled in the art to which it appertains to make and use the same.

This invention relates to wood working machines, and it has special reference to planing machines that are adapted to shape timbers, planks and the like, in fair curves to any varying outline or contour and at the same time to any varying bevel or angularity.

In building wooden ships, for instance, each strake of planking varies materially in width or contour from stem to stern, while the angularity of the bevel of the strake is similarly variable throughout the length of the ship.

It is one of the objects of the present invention to provide a continuously operating machine which shall be adapted to operate upon a timber, plank, or the like, or upon a succession of such pieces constituting the full strake of the ship, in such manner that the required shape, with respect to both the varying profile or contour and the varying angularity of the bevel throughout the entire length, shall be obtained by a single passage of the piece or series of pieces through the machine.

Another object of the invention is to provide a machine of the above indicated type which shall be provided with a cutter that, during the continued operation of the machine, can be independently and concurrently adjusted in position both laterally of the work to vary the outline or contour thereof and angularly with respect thereto to vary the bevel of one of the surfaces of the work being operated upon, whereby the desired results are secured.

A further object of the invention is to provide a machine of this general class that may be adjusted at will during its operation, and without the necessity of laying out the desired contour and bevel upon the timber itself, to produce a finished product that shall have a fair and smooth curvature of contour and angularity of bevel of the prescribed characteristics.

A still further object of the invention is to provide a machine that shall embody semi-automatic control apparatus by means of which the cutter may be adjusted for any varying or changeable contour and bevel in accordance with a templet or pattern that is fed by the apparatus at a rate which is exactly proportionate to the travel of the work through the machine.

Accordingly, one feature of the present invention resides in a wood-planing machine having a rotating cutter past which the work is fed and which is provided with manually operable cutter adjusting mechanism by means of which the cutter may be shifted bodily in a direction toward and from the work whereby the width or contour of the work may be varied and also may be independently and concurrently tilted angularly of the work to effect variations of the bevel thereof without producing any changes in the contour.

Another feature of the invention lies in the provision of an auxiliary control table and apparatus for feeding a sheet templet or pattern upon which fair curves are plotted or laid out representing the desired variations of contour and bevel, or other characteristics, of the timber, plank, or other work, which the machine is to produce. In connection with this templet or pattern and in coöperative relation with the manually operable cutter adjusting mechanism, a plurality of movable pointers are provided which may, through the operation of said adjusting mechanism, be independently adjusted, as the templet is fed, so as to follow or trace the respective templet characteristic curves, whereby the cutter is laterally positioned and angularly tilted in accordance with the variations of the contour and bevel curves of the templet, to cause the work passing through the machine to be shaped to the requisite characteristics.

A further feature of the invention consists in a driving mechanism interposed between the work passing through the machine and the templet feeding device by means of which the templet is actuated or fed across the control table in exact proportion and correspondence with the actual feed of the work through the machine, thus insuring precise accuracy in reproducing throughout the length of the work the changes in contour and bevel indicated by the plotted curves upon the templet. In order to permit of ready adjustment of the templet with respect to the work itself before the work is fed and the cutting operation is initiated, a controllable clutch is provided in the templet driving mechanism, whereby the templet may be disconnected for adjustment into exact correspondence with the forward end of the work.

Other objects of the invention and features by means of which they are attained will become apparent from the following description of the preferred embodiment of the invention illustrated in the accompanying drawings.

Although the preferred embodiment of the invention is illustrated and described as embodying a specific construction and arrangement and location of parts, it should be understood that the invention, in its broader aspects, is not so restricted. Obviously, the advantages and benefits of the invention may be obtained, to a greater or less extent, by mechanisms of materially modified and widely different character of construction and operation. Therefore, with due regard to the spirit and scope of the invention, only such limitations should be imposed as are indicated in the appended claims.

The invention may best be understood by reference to the preferred embodiment of the invention illustrated in the accompanying drawings, in which,—

Figure 1 is a view in side elevation of a machine constructed in accordance with the invention, certain parts being broken away for the sake of clearness; Fig. 2 is a plan view of a portion of the apparatus shown in Fig. 1; Fig. 3 is a view, partially in end elevation and partially in section upon the section line 3—3 of Fig. 2; Fig. 4 is a view partially in side elevation and partially in section, upon the section line 4—4 of Fig. 3; Fig. 5 is a similar view taken on the section line 5—5 of Fig. 3; Fig. 6 is a view in side elevation looking at the rear portion of the control apparatus shown in Figs. 1 and 2; and Figs. 7 and 8 are views in end elevation of the respective ends of the control apparatus shown in Fig. 6.

Referring to the drawings, the apparatus shown comprises in general a pair of feed roll units 10 and 12 including feed rolls 14 for feeding the work to be operated upon; a planing unit 16 including an adjustable cutter 18 for operating upon the work as it is fed; a differential cutter adjusting mechanism 20 including feed screws 22 and 24 for independently laterally adjusting and tilting the cutter toward and from the work as it is fed to vary the width or contour and the angularity of the bevel of the work to be produced; auxiliary control apparatus 26, including a movable templet 28 having plotted thereon a continuous contour curve C and a continuous bevel curve B, in accordance with which the differential adjusting mechanism and consequently the cutter may be adjusted to cause said cutter to plane the work passing through the machine to the varying characteristics indicated by the templet curves; and a driving mechanism including a spurred chain 30 and shaft 32 for feeding the templet 28 in exact correspondence and in definite proportion with the work that is fed through the machine.

The feed roll units 10 and 12 and the planing unit 16 are supported upon a frame structure comprising longitudinally disposed beams 36 and cross-beams 38 (Figs. 1, 2 and 3) the feed roll units being disposed on opposite sides of the planing unit in order to properly handle the work as it is fed to and from the planing unit disposed between them.

The feed roll units 10 and 12 form no material part of the present invention, except in so far as they constitute adequate means for feeding the work to the planing cutter and, therefore, may be of any suitable construction. As shown, these units are of like construction and each comprises upright side brackets 40 that are rigidly connected by means of a top plate 42 and which carry in suitable journal boxes 44 a plurality of shafts 46 upon which are mounted the feed rolls 14. The lower set of feed rolls is fixed with respect to the supporting side brackets while the upper set thereof is vertically adjustable in order to accommodate the different sizes and variations in form of the timbers, planks, or the like, that are fed into the machine.

In order to drive the feed rolls, the shafts 46 carrying the lower feed rolls 14 are provided at their rear ends with gear wheels 48 that coöperatively mesh with a pinion 50 that is carried by a shaft 52, which is journaled in the side brackets 40. The upper set of feed rolls 14 is correspondingly driven by means of gear wheels 54 that are fixed to the respective shafts 46 and are mechanically associated with gear wheels 56 which are carried by the lower feed roll shafts 46 through the agency of idler gear wheels 58 and 60. The idler gear wheels 58 are adjustably held in position in a well known manner by means of links 62 and 64 in order to permit the upper feed rolls 14 to accommodate themselves to different sizes and variations in form of the work.

The feed rolls 14 of the respective feed roll units 10 and 12 are similarly and correspondingly driven by means of a chain 68 (Fig. 1) which coöperates with sprockets 70 that are mounted upon the shafts 52 of the respective units. This chain 68 also coöperatively engages an idler sprocket 72 and a sprocket 74 that is secured to a jack-shaft 76, said jack-shaft being provided with another sprocket 78 which is connected to a sprocket 80 upon another jack-shaft 82 by means of a chain 84. The jack-shaft 82 is also provided with a sprocket 86 which normally is loosely associated therewith, and which is driven continuously through a chain 88 from any suitable source of power. The loosely mounted sprocket 86 is adapted to be rigidly connected to the jack-shaft 82 under the control of the operator by means of any suitable type of clutch 89 and a control handle 90. Inasmuch as the construction and operation of the clutch is entirely incidental to the present invention, no detailed illustration or description thereof is deemed necessary. As shown, however, the clutch embodies a yoke member 92, the actuation of which effects the connection and disconnection of the clutch parts (not shown) as will be understood, and said yoke member 92 is suitably connected to the control handle 90 through the agency of which the operator may control the operation of the feed rolls as desired.

The planing unit 16 (Figs. 1, 2 and 3) embodying the rotatable cutter 18 comprises upright side brackets 100 and 102 which are mounted upon and secured to the longitudinal timbers 36 of the supporting frame, and which are rigidly connected together at their upper and lower ends by means of a plurality of cross-braces 104. The cross-braces 104 of both the upper and lower sets are channel-shaped in section and are provided with oppositely disposed ways 106 (Figs. 2 and 5) which extend transversely across the planing unit to receive and guide a pair of slidable supporting yokes 108 that are laterally movable in the ways. Each of these supporting yokes 108 is bifurcated and between the arms thereof a bearing block 110 is pivotally mounted upon a pin 112 that extends longitudinally of the machine in a horizontal direction. The bearing blocks 110 surround and carry a rotatable cutter shaft 114 upon which is mounted the cutter 18. The cutter shaft 114 is supported in its operative position by means of collars 116 and 118 constituting thrust bearings that are secured thereto and are disposed at the opposite ends of the lower bearing block 110.

The cutter 18 may be of any well known type, and as shown, comprises four cutter knives 120 that are suitably bolted in angular relation to the sides of a rectangular head 122 that is fixed to the shaft. If desired, two oppositely disposed cutter knives may be positioned at a slight angle to the axis of the shaft 114 in order to produce a slight predetermined "out-gage" bevel at the lower edge of the work.

For the purpose of supplying power to rotate the cutter 18, the shaft 114 is provided with pulleys 124 at its respective ends and these pulleys coöperate with belts 126 that are continuously operated from a suitable source of power.

During the operation of the machine the work is supported adjacent the cutter upon a plurality of plates 128 (Figs. 2 and 3) that are bolted to the upper surfaces of the lower cross-braces 104, and is guided and maintained in operative relation with the cutter during its feeding movement by means of a vertically disposed guide member 130 that is suitably secured to the upright bracket 100 at the rear side of the machine.

In order to vary the width or contour of the work passing through the machine, the cutter 18 is adjusted laterally toward and from the work, and variations in the angularity of the bevel on the side of the work being planed with respect to its top and bottom surfaces are secured by tilting the cutter toward and from the work. With the cutter in a vertical position, as shown in Fig. 3, the side of the work being operated upon is planed at right angles to its top and bottom surfaces, but if the cutter be tilted to either side of the vertical, the planed surface is beveled accordingly, a tilting of the cutter to one side thereof producing a "standing" or positive bevel and a tilting to the other side thereof an "under" or negative bevel. These lateral and tilting adjustments of the cutter are effected during the operation of the machine by means of the differential cutter adjusting mechanism referred to generally by the reference character 20, which is constructed and operates in the manner now to be set forth.

Referring particularly to Fig. 3, the upper and lower yoke members 108 which are slidably mounted in the transverse ways 106, and which carry the bearing blocks 110 that support the cutter shaft 114, are adjustably positioned transversely of the machine by means of the threaded adjusting screws 22 and 24 that are respectively connected to said yoke members. Each of these adjusting screws is provided with a head 134 that is rotatably secured to its associated yoke member 108 by means of a yoke or stirrup member 136 that extends over the end of the supporting yoke member 108 and is secured to the upper and lower surface thereof by bolts 138. The stirrup member 136 is provided with an opening, through which a reduced portion of the head 134 loosely projects. Each of the adjusting screws 22 and 24 projects forwardly through openings 140 and 142 that are respectively provided in the forward supporting bracket 102 and in an auxiliary bracket 144 that is rigidly secured thereto.

This auxiliary bracket 144 is spaced from the main bracket 102 and is provided at its upper end with inwardly extending horizontal flanges 146 and with inwardly extending vertical flanges 148 (Fig. 4) which are bolted to the main bracket 102. The lower end of the auxiliary bracket 144 is provided with inwardly extending vertical flanges 150 (Fig. 4) that are also bolted to suitable portions of the main bracket 102.

Inasmuch as no threads are provided upon the surfaces of the openings 140 and 142, the adjusting screws 22 and 24 are freely movable in a longitudinal direction with respect to the main and auxiliary brackets 102 and 144. However, in the spaces between the main and auxiliary brackets, internally threaded rotatable sleeves 154 are confined, and the threads of these sleeves coöperate with the threads of the adjusting screws in such manner that if the sleeves be rotated by external means, the adjusting screws are longitudinally actuated to effect corresponding adjustments of the supporting yokes 108 that carry the cutter shaft 114 and the cutter 18.

Independent longitudinal adjustments of the screws 22 and 24, and therefore of the cutter, are effected by means of another pair of unthreaded sleeves 156 that surround the screws and are located in front of the auxiliary bracket 144. These sleeves 156 are maintained in position with respect to the auxiliary bracket 144 by means of fingers or keys 160 that are secured to said bracket and which project into annular recesses 162 provided in the adjacent faces of the sleeves. These sleeves 156 are mechanically associated with the adjusting screws 22 and 24 by means of keys or tongues 164 that project loosely into slots 166 that extend longitudinally throughout the lengths of the adjusting screws. With this construction, if the sleeves 156 be rotated by any external means, the adjusting screws 22 and 24 associated therewith are correspondingly turned and, by reason of their screw-threaded engagement with the confined sleeves 154, are actuated longitudinally to effect adjustments of the cutter as will be understood. Each adjusting screw, therefore, may be independently actuated by either of the sleeves 154 and 156 that coöperate therewith.

The adjusting sleeves 156 of the respective screws 22 and 24 are utilized for the purpose of actuating the cutter bodily in a lateral direction toward and from the work to vary the width or contour thereof, and in order to effect this result these sleeves are provided with gears 170 which are mechanically connected to operate the respective adjusting screws concurrently and in like directions and through like distances by means of a set of idler gears 172, 174 and 176 (Figs. 1 and 3) that are respectively mounted upon studs 178, 180 and 182, that are mounted upon the auxiliary bracket 144.

For the purpose of actuating the adjusting sleeves 156 which are coupled together for concurrent movement in the manner just described, the gear 170 that forms a part of the sleeve 156 which coöperates with the lower adjusting screw 24 also coöperates with a gear wheel 186 (Figs. 1 and 2) that is pivotally mounted upon a stud 188 projecting from an arm 190 that forms a part of the auxiliary bracket 144. This gear wheel 186 is driven by a pinion 192 that is fixed to a shaft 194 having bearings 196 (Fig. 2) and 198 (Fig. 3) that are associated respectively with the arm 190 and with the frame of the auxiliary control apparatus designated by the general reference character 26. The forward end of the shaft 194 is provided with a hand wheel 200 by means of which the shaft may be turned and the cutter laterally adjusted through the interposed mechanism and gearing hereinbefore described, it being understood that as the hand wheel 200 is rotated in one direction, the respective adjusting screws 22 and 24 are correspondingly advanced to adjust the cutter bodily in a lateral direction toward the work, while the rotation of the hand wheel in the opposite direction causes the adjusting screws to retract the cutter bodily in a direction away from the work.

Having set forth the mechanism and the manner of effecting the lateral adjustments of the cutter with respect to the work, consideration will now be given to the mode of actuating the cutter to effect its tilting movements with respect thereto.

The tilting movements of the cutter are produced through the agency of the adjusting sleeves 154 that are confined between the main and auxiliary bracket 102 and 144, and these sleeves are severally provided with gears 206 which are mechanically associated for concurrent operation through the agency of intermediate idler gear wheels 208, 210, 212, 214 and 216 (Figs. 3 and 4) the gear wheels 208, 210 and 212 being respectively rotatably mounted upon the studs 217, 218 and 182 that are carried by the auxiliary bracket 144, and the gear wheels 214 and 216 being fixed to a shaft 220 that is rotatably mounted in bearings that are respectively associated with the auxiliary bracket 144 and with the frame of the auxiliary control apparatus designated by the general reference character 26. The forward end of this shaft 220 is provided with a hand wheel 222 by means of which said shaft and gear train just described may be actuated.

This gear train is so designed that as the hand wheel 222 is rotated, the adjusting sleeves 154 that coöperate with the respective adjusting screws 22 and 24 are operated in opposite directions, so that while the upper adjusting screw 22 is longitudinally advanced, the lower adjusting screw 24 is correspondingly retracted and vice versa, whereby the cutter is tilted toward or from the work to cause the work to be planed to any desired positive or negative bevel. Not only does this gear train effect concurrent opposite adjustments of the adjusting screws 22 and 24, but it is also so designed, by properly choosing the ratio of the gearing, to cause the longitudinal adjustments thereof to be of different degrees in order to cause the cutter to be tilted about a relatively fixed axis that is located at the juncture of the cutter with the lower surface of the work.

With this construction, as the hand wheel 222 is adjusted in one direction, the adjusting screws 22 and 24 are actuated in opposite directions and in such ratio as to tilt the cutter toward the work about the relatively fixed axis just referred to, to produce a positive bevel, while adjustments of the hand wheel in the opposite direction effect tilting movements of the cutter away from the work and about said axis to produce a negative bevel. By reason of the fact that the gearing is designed to effect tilting movements of the cutter about a fixed axis at the juncture of the cutter and the bottom surface of the work, it is evident that the tilting adjustments of the cutter produce only changes in the bevel of the work and have no effect whatever upon the width or contour thereof. Therefore, the lateral adjustments of the cutter to effect changes in the contour of the work are entirely independent of the tilting adjustments thereof, whereby it is apparent that these respective adjustments may be effected concurrently if desired without the one influencing or having any effect upon the other. As the work is fed through the machine, therefore, the cutter may be laterally adjusted and tilted toward and from the work either successively or concurrently to cause the work to be planed to any desired variations in contour and in bevel.

Having described the manner in which the cutter is adjusted to secure a varying contour and bevel, consideration will now be given to the means by which and in accordance with which these adjustments are effected to produce upon the work the prescribed contour and bevel desired. This means comprises the auxiliary control apparatus designated by the general reference character 26 which is conveniently located in front of the machine and which embodies the templet 28 that is actuated in exact correspondence with the feeding movements of the work being operated upon, and which is provided with a plurality of continuous curves B and C that are plotted thereon to represent the variations in bevel and in contour of the work to be produced throughout its required length.

As shown, the control apparatus is adapted to function upon a longitudinal templet sheet which is plotted with the curves just mentioned, and which is fed from one spool to another in a manner somewhat analogous to similar devices employed in other arts, but it should be understood that the invention in its broader aspects, is quite independent of the specific control mechanism illustrated and that said mechanism may be adapted to function upon templets of widely different character, the fundamental requisite being merely that a templet of some form or other upon which the prescribed characteristics of the work to be produced are plotted, be employed to govern the respective adjustments of the cutter whereby the variations of the templet curves are reproduced upon the work.

The control apparatus 26 for handling the templet sheet comprises (Figs. 2, 6, 7 and 8) a horizontal table 230 that is supported at its ends upon frames or standards 232. At the right hand end of the table, as viewed in Fig. 2, means is provided for rotatably supporting a spool 234 upon which the templet is initially rolled. The spool 234 is removably positioned between supporting end members 236 and 238 (Fig. 7) the member 236 being provided with a tongue or key 240 that projects into a corresponding slot in one end of the spool, and the other end member 238 being provided with a pin 242 which projects into a central opening in the other end of the spool. The end member 236 having the key 240 is suitably journaled in the frame of the templet table and is provided with a disk 246 against which a suitable brake device 248 operates to place a tension upon the templet sheet as it is fed over the table. The other end member 238 for supporting the spool is carried by the frame of the table and is held in its operative position by means of a spring 250 in a manner common to such devices, whereby the spool is pivotally supported to permit the templet to be unwound as the templet is fed.

The free end of the templet passes in coöperative engagement with a plurality of idler rolls 254 (Fig. 6) which are rotatably mounted in the frame above the spool 234 whence the templet stretches across the table 230 and over a feed roll 256 that is rotatably mounted at the other end thereof, and thence to a spool 258 that is similarly mounted beneath the feed roll and upon which the templet is adapted to be wound. During the passage of the templet across the table, it is guided and maintained in proper position by means of a guide strip 257 (Fig. 2) and a plate 259 which are secured to the table 230 and engage the respective edges of the templet.

The feeding movements of the templet are effected through the rotation of the feed roll 256 which is accomplished in a manner to be hereinafter set forth. In order to insure the reliable and positive feed of the templet a plurality of pressure rolls or disks 260 (Figs. 6 and 8) are provided upon a vertically movable shaft 262, the ends of which are journaled in blocks 264 that are slidably movable between ways 266 with which the side brackets 268 of the frame are provided. The pressure disks 260 are normally maintained in positive engagement with the templet upon the feed roll 256 through the agency of coil springs 270 which act downwardly upon the respective journal blocks 264 that carry the shaft 262, and the pressure exerted by these springs is rendered adjustable by means of adjusting screws 272 in a well-known manner.

Provision is made to enable the pressure disks 260 to be raised from the templet through the agency of a hand wheel 274 that is fixed to a shaft 276 journaled at its ends in the side brackets 268. This shaft 276 is provided adjacent its bearings in the side brackets 268 with sections 278 having segmental portions removed therefrom, and the segmental recesses thus provided are adapted to receive lateral extensions 280 of arms 282 that form integral parts of the journal blocks 264. In the position shown in Figs. 6 and 8, the straight portions of the recessed sections 278 of the shaft 276 are horizontally disposed to permit the springs 270 to force the pressure disks 260 into engagement with the templet upon the feed roll 256. However, if the shaft 276 be partially rotated by the hand wheel 274, the recessed sections 278 of said shaft serve as cams to act upon the lateral extensions 280 of the arms 282 and raise the journal blocks 264 in position in opposition to the action of the springs 270 whereby the shaft 262 and the pressure rolls 260 carried thereby are elevated out of engagement with the templet.

The spool 258 upon which the templet is wound during its feeding movements, is similar to the supply spool 234 already described, and is removable and rotatably mounted between the side frames in a similar manner, which need not be again described, except to state that the end member 284 (Figs. 6 and 8) that is provided with a key or tongue 286, extends rearwardly and has fixed thereto a pulley 288, by means of which the winding spool 258 is rotated in a manner to be hereinafter set forth.

As already stated, the feeding movements of the templet are accomplished by means of a driving mechanism including the shaft 32 and the spurred chain 30 which is adapted to engage and be actuated by the work as it passes through the machine, so that the templet is fed in exact correspondence and step with the feeding movements of the work itself.

With particular reference to Figs. 1, 2, and 5, the chain 30 is carried upon sprockets 290 and 292 that are respectively mounted upon shafts 294 and 32, which are suitably journaled in extending portions 295 of the brackets 40 of the respective feed roll units. On the opposite sides of each alternate link of the chain, small plates 296 are secured, and these plates are provided with spurs 298 that project outwardly therefrom. The upper stretch of the chain is supported and guided in position directly beneath the work by means of a channel-shaped guide member 300 that is longitudinally disposed across the lower braces 104 of the planing unit. This guide member 300 is supported on springs 302 that tend to urge it upwardly to cause the spurred chain to engage the work, and said member is loosely held in position by means of studs 304 that are fixed thereto and project downwardly through openings in the upper flanges 306 of the crossbraces 104.

When the work is fed through the machine, it is brought into engagement with the spurs 298 of the chain 30, which spurs are caused to penetrate the work to a sufficient distance to establish a driving connection between the work and the chain. The chain therefore is fed by the work itself and in exact correspondence with the movements thereof. This feeding movement of the chain is utilized through the shaft 32 to drive the tempest feed roll 256 accordingly and in order to effect this result the forward end of the shaft 32 is provided with a longitudinally slidable clutch member 308 (Figs. 2 and 8) and is secured thereto by means of a key 310. The clutch member 308 is provided with gear teeth 312, which in the position indicated in Fig. 8, are adapted to mesh with a gear wheel 314 carried by the frame of the control apparatus, which gear wheel in turn meshes with a gear wheel 316 that is fixed to the end of the shaft 318, upon which the feed roll 256 is mounted. The clutch member 308 is maintained in the operative position shown in Fig. 8 by means of a spring-pressed detent 320 that coöperates with a slight depression in the key 310. With this construction, it is evident that the templet derives its feed directly from the work itself, so that the feeding movements of the templet are in exact correspondence with those of the work.

By suitably choosing the ratio of the gear train, through the agency of which the feed roll 256 is driven, any desired feeding of the templet with respect to the work may be secured, depending of course upon the longitudinal scale that is arbitrarily adopted for plotting the characteristic curves B and C upon the templet sheet. If, for instance, longitudinal dimensions are plotted upon the templet on a scale of 8 to 1, the ratio of the gear train must also be 8 to 1 in order to maintain the necessary correspondence between the feeding movements of the templet and the work.

The winding spool 258 is actuated from the shaft 32 by means of a pulley 319 (Figs. 6 and 8) which is connected to the pulley 288 that is associated with the end member 284 upon which the spool is mounted by means of a belt 321, the tension of which is maintained by an idler pulley 323 in accordance with customary practice. As the templet is fed, therefore, it is wound upon the spool 258.

Having described the means and manner of feeding the templet in accordance with the feeding movements of the work, there remains to be considered the means and mode of laterally adjusting and tilting the cutter toward and from the work in accordance with the variations of the contour and bevel curves of the templet.

This is accomplished through the agency of a plurality of line-tracing pointers 326 and 328 (Figs. 1, 2 and 6). These pointers 326 and 328 are adjustably mounted in blocks 330 that are secured to the ends of rods 332 that extend forwardly from and are supported by the upper ends of arms 334 which are mounted upon and have a traveling threaded engagement with the respective adjusting shafts 194 and 220. The arms are provided with downward extensions 336 having bifurcated ends that loosely straddle rearwardly extending guide bars 338 that are suitably secured to the frame of the control table.

The ends of the pointers 326 and 328 are disposed in proximity to the templet passing over the control table. The pointer 326 is the bevel pointer and is adapted to be adjusted back and forth in position by means of the hand wheel 222 to cause it to trace the variations of the bevel curve B as the templet is fed, while the pointer 328 constitutes the contour pointer and is caused to trace the contour curve C of the templet by suitable adjustments of the hand wheel 200. These separate adjustments of the respective bevel and contour pointers are independently transmitted to the cutter 18 through the differential cutter adjusting mechanism hereinbefore described. It is manifest therefore that if the respective pointers 326 and 328 are manipulated by the operators during the feeding movements of the work and the templet to cause them to trace the respective bevel and contour curves, the cutter is correspondingly adjusted in position to cause it to plane the work in exact correspondence with the variations in bevel and in contour that are indicated upon the templet sheet.

An essential requisite in the proper operation of the machine is that prior to the planing operation, the templet be longitudinally adjusted so as to bring the length mark L (Fig. 2) upon the templet, indicating the beginning of the work, into exact step or correspondence with the forward end of the work itself. Inasmuch as the timber, plank or the like, may be defective at its forward end, it is frequently desirable to make allowances for the defective portion thereof and to plane the work from a point somewhat removed from the actual end thereof so that the bad end may be later cut off and discarded. In this event, the work is marked at the point (F) as shown in Figs. 1 and 2, which is to be the forward end of the finished product and it is this point of the work to which the length mark of the templet should be adjusted before the planing operation is started.

In the specification and claims, the phrase "forward end of the work," therefore, is used in an inclusive sense to mean both the actual forward end of the work or that point in the work which is removed from the actual end thereof, but which is to constitute the end of the finished product.

In effecting this preliminary adjustment, the work is fed into the machine until the forward end thereof is opposite the cutter and in position to be operated upon thereby. The operator having control of the main clutch handle 90 then throws out the main clutch and thereby disconnects the feed rolls 14 from the source of power. Subsequently the templet feed clutch member 308 is thrown out temporarily and the templet adjusted into step or correspondence with the forward end of the work. The main clutch may then be thrown in by the handle 90 to effect the feeding of the work which is planed to the varying contour and bevel indicated by the templet curves in the manner already explained.

For the purpose of indicating to the operator when the forward end of the work has just reached the cutter, a pair of vertical sight wires 340 (Fig. 1) are conveniently stretched across openings in the side brackets 40 of the feed roll unit 12 in advance of the cutter, and the work itself, before it is fed into the machine, is provided with a mark M that is spaced from its forward end a distance equal to that between the cutter and the sight wires. When the work has been fed to a position in which the mark M lies in exact coincidence with the sight wires 340, it is clear that the forward end of the work lies opposite the cutter, and the operator throws out the main clutch to discontinue the feeding of the work until the templet driving mechanism is disconnected and the templet properly adjusted into step with the work.

In Figs. 1 and 2, the apparatus is illustrated with two pieces of work in the machine, the first just being finished, and the second spaced slightly from the first and about to be fed into working relation with the cutter. The second piece of work has a defective forward end and is therefore marked at F to indicate the ultimate finished end thereof and is also provided with a mark M disposed at a predetermined distance therefrom to enable the operator to determine when the forward end F is opposite the cutter.

When the machine is to be utilized to plane a succession of pieces of work, for instance the several "woods" constituting a full strake of a ship, the templet is first plotted with continuous bevel and contour curves representing the variations of these characteristics throughout the entire length of the strake, either as measured directly from the ship itself or as taken from developments of its design. The templet is also provided with length marks L to denote the exact lengths of the various "woods."

The timbers, planks or the like, are then selected from the available lumber and their forward ends are marked in the manner already described.

These several pieces of work are then fed into the planing machine in more or less irregular spaced succession and are successively planed in accordance with the characteristic curves of the templet as it is fed in correspondence to the work.

In order to avoid discrepancies that would be caused by the spacing of the successive pieces and by the defective end portions thereof, it is necessary to stop the feed rolls as the forward end of each piece is brought opposite the cutter. The templet is then adjusted in the manner already set forth to bring the length mark L representing the beginning of the particular "wood" or piece about to be operated upon into step or correspondence with the forward end of the work itself.

In this way, the successive pieces or "woods" of a full strake may be rapidly and accurately planed in smooth curves to the prescribed variations of contour and angularity of bevel indicated by the continuous templet characteristic curves.

Having set forth the construction and mode of operation of the preferred embodiment of the invention, that which is claimed as new is:—

1. A wood working machine having, in combination, a planing cutter, means for effecting relative feeding movements of the cutter and the work, means associated with the respective ends of the cutter for adjusting the cutter laterally with respect to the work and for tilting the cutter toward and from said work.

2. A wood working machine having, in combination, a planing cutter, means for effecting relative feeding movements of the cutter and the work, supporting and adjusting means severally coöperating with the respective ends of said cutter, and means for actuating said last means either in the same or opposite directions whereby said cutter is adjusted laterally or tilted toward and from the work.

3. A wood working machine having, in combination, a planing cutter, means for effecting relative feeding movements of the cutter and the work, means for supporting and adjusting the respective ends of said cutter, and means coöperating with both of said supporting means for actuating said means in opposite directions toward and from the work to vary the bevel thereof.

4. A wood working machine having, in combination, a planing cutter, means for effecting relative feeding movements of the cutter and the work, means for supporting the cutter at its respective ends, plural means severally connected to and acting upon said supporting means for shifting said ends in the same direction through like distances toward or from the work and for shifting said ends in opposite directions with respect thereto.

5. A woodworking machine having, in combination, a planing cutter, means for longitudinally feeding the work past the cutter, means severally connected to and acting upon the respective ends of the cutter for shifting said ends in the same direction and through like distances toward or from the work and for shifting said ends in opposite directions through unlike distances toward and from the work.

6. A woodworking machine having, in combination, a planing cutter, means for effecting relative feeding movements of the cutter and the work, means for supporting the cutter at its respective ends, and differential adjusting mechanism connected to each of said supporting means for shifting the cutter laterally of the work and for tilting the cutter to and from the work whereby the contour and the bevel of the work may be varied independently and concurrently.

7. A wood-working machine having, in combination, a planing cutter, means for longitudinally feeding the work past the cutter, means for supporting the respective ends of the cutter, adjusting screws associated with the respective supports, and means for advancing or retracting said screws either in the same direction or in opposite directions for controlling the position of said cutter with respect to the work being fed.

8. A wood-working machine having, in combination, a planing cutter, means for longitudinally feeding the work past the cutter, means for supporting the respective ends of the cutter, adjusting screws associated with the respective supports, manually operable means for advancing or retracting said screws through like distances in the same direction, and other manually operable means for adjusting said screws in opposite directions.

9. A wood-working machine having, in combination, a planing cutter, means for effecting relative movements of the cutter and the work, an adjusting screw for varying the position of said cutter, means for advancing said screw without rotation thereof, and independent means for rotating said screw to effect its advancement.

10. A wood-working machine having, in combination, a planing cutter, means for longitudinally feeding the work past the cutter, means for supporting the respective ends of said cutter, adjusting screws coöperating with said supports, means associated with both of said screws for longitudinally moving said screws without rotation, and other means associated with both of said screws for rotating said screws to effect their longitudinal actuation.

11. A wood-working machine having, in combination, a planing cutter, means for effecting relative feeding movements of the cutter and the work, control apparatus disposed at a point removed from said cutter and embodying a templet sheet plotted with a curve representing the varying changes of a characteristic of the work to be produced, means for feeding the templet sheet in accordance with the relative feeding movements of the cutter and the work, a tracing device in proximity to said templet sheet, manually controlled means for adjusting said device to cause it to trace the characteristic curve of said templet sheet, and means interposed between said control apparatus and said adjustable cutter for causing the movement of said tracing device to be transmitted to said cutter, whereby the cutter is adjusted to reproduce upon the work said templet characteristic.

12. A wood working machine having, in combination, a planing cutter, means for effecting relative feeding movements of the cutter and the work, control apparatus disposed at a point removed from said cutter and embodying a table, a templet sheet having varying curves plotted thereon to represent the varying characteristics of the work to be produced, means for feeding the templet sheet in accordance with the relative feeding movements of the cutter and the work, adjustable pointers disposed above said table and in proximity to the templet sheet, manually controlled for adjusting the positions of the said pointers to cause them to trace the curves upon the templet sheet as it is fed, and means interposed between said control apparatus and said cutter for causing said cutter to be adjusted in position in accordance with the movements of said pointers whereby the characteristics of the templet curves are reproduced by the cutter upon the work.

13. A wood working machine having, in combination, a planing cutter, means for longitudinally feeding the work past the cutter and auxiliary control apparatus removed from said cutter and embodying a movable templet sheet plotted with curves to represent the variations in contour and in bevel of the work to be produced, a pair of pointers in proximity to the templet sheet, manually controlled means for independently adjusting the positions of said pointers to cause them to trace the templet curves as the templet sheet is moved, and means interposed between the control apparatus and the cutter for causing the cutter to be adjusted laterally toward and from the work in accordance with the movements of one of said pointers and for causing the cutter to be tilted toward and from the work in accordance with the movements of the other pointer.

14. A wood working machine having, in combination, a planing cutter, means for longitudinally feeding the work past the cutter, control apparatus embodying a templet removed from the work and plotted with curves to represent varying characteristics of the work to be produced throughout its length, mechanism mechanically associated with the work itself and interposed between the work and the templet for feeding the templet in exact correspondence with the feeding movements of the work, and manually controlled means for adjusting the cutter in accordance with the templet characteristic curves to cause said cutter to reproduce said characteristics upon the work.

15. A wood working machine having, in combination, a planing cutter, means for longitudinally feeding the work past the cutter, and control apparatus embodying a movable templet, an endless chain disposed beneath the work and having spurs adapted to engage the work, means for resiliently maintaining a working relation between said spurred chain and the work, and means actuated by said chain for feeding the templet in exact correspondence with the feeding movement of said work.

16. A wood working machine having, in combination, a planing cutter, means for effecting relative feeding movements of the cutter and the work, control apparatus disposed at a point removed from said cutter and embodying a table, a templet sheet plotted on a reduced scale with curves representing the varying characteristics of the work to be produced, said templet sheet being initially in the form of a roll, means for progressively unwinding the roll and feeding the templet sheet across said table and in accordance with the feeding movements of the work, a plurality of adjustable pointers disposed above the table and in proximity to the templet sheet, manually operable means for adjusting the positions of said pointers to cause them to trace the templet sheet curves as it is progressively fed, and means interposed between said control apparatus and said cutter for causing said cutter to be adjusted in position in accordance with the movements of said pointers whereby the characteristics of the templet curves are reproduced by the cutter upon the work.

17. A wood working machine having, in combination, a planing cutter, means for feeding a succession of pieces of work past the cutter, an auxiliary control apparatus removed from said cutter and embodying a table, a templet sheet initially in the form of a roll and plotted upon a reduced scale with a continuous curve representing the variations of a characteristic of the several successive pieces of work, means for progressively unwinding the roll and feeding the templet sheet across the table and winding up said sheet after passing over said table, said feeding movements being in a predetermined relation to the feeding movements of each of the successive pieces of work, and an adjustable pointer disposed above said table and in proximity to said templet sheet adapted to be adjusted to trace the templet curve as the templet sheet is fed, and means for adjusting the cutter in accordance with the movements of said pointer to cause the successive pieces of work to be planed accordingly.

18. A wood working machine having, in combination, a planing cutter, means for feeding a succession of pieces of work past the cutter, a templet plotted with a curve representing throughout its length the dissimilar variations of a characteristic of the successive pieces of work to be produced, means for feeding said templet in exact correspondence with each of the successive pieces of work, and manually controllable means for tracing said characteristic curve as the templet is fed and for adjusting the cutter in accordance therewith, whereby each successive piece of work is planed to conform to the variations of that portion of the characteristic curve which corresponds to that particular piece of work.

19. The method of preparing a succession of dissimilar timbers, planks or the like, which comprises plotting upon a templet sheet, a continuous curve representing the variations of a characteristic of the successive pieces of work to be produced, feeding each successive piece of work concurrently with the templet sheet and in predetermined relation to the corresponding portion thereof, and planing each piece of work as it is fed in accordance with the characteristic curve of the corresponding portion of the templet sheet.

20. The method of preparing the successive woods of a ship's strake, which comprises plotting upon a templet sheet and on a reduced scale, two curves respectively representing the variations of contour and of bevel of the successive woods, feeding each successive wood concurrently with the templet sheet and in predetermined relation to the corresponding portion thereof, and planing each wood as it is fed to the varying contour and bevel represented by the contour and bevel curves of the corresponding portion of the templet sheet.

JOEL F. SHEPPARD, 2ND.
WILLIAM D. FLETCHER.